United States Patent
Choi et al.

(10) Patent No.: US 8,328,472 B2
(45) Date of Patent: Dec. 11, 2012

(54) CUTTING INSERT

(75) Inventors: Chang Hee Choi, Daegu (KR); Chang Gyu Park, Daegu (KR)

(73) Assignee: TaeguTec, Ltd., Daegu (KR)

( * ) Notice: Subject to any disclaimer, the term of this patent is extended or adjusted under 35 U.S.C. 154(b) by 413 days.

(21) Appl. No.: 12/675,440

(22) PCT Filed: Aug. 30, 2007

(86) PCT No.: PCT/KR2007/004182
§ 371 (c)(1),
(2), (4) Date: Feb. 26, 2010

(87) PCT Pub. No.: WO2009/028748
PCT Pub. Date: Mar. 5, 2009

(65) Prior Publication Data
US 2010/0239379 A1    Sep. 23, 2010

(30) Foreign Application Priority Data
Aug. 29, 2007   (KR) .................. 10-2007-0087151

(51) Int. Cl.
*B23C 5/00*   (2006.01)
*B23C 5/02*   (2006.01)
(52) U.S. Cl. ........................ 407/113; 407/114
(58) Field of Classification Search .......... 407/113, 407/114, 115, 116
See application file for complete search history.

(56) References Cited

U.S. PATENT DOCUMENTS

| | | | |
|---|---|---|---|
| 4,618,296 A * | 10/1986 | Allaire et al. | 407/42 |
| 5,190,419 A * | 3/1993 | Lindberg et al. | 407/42 |
| 5,597,271 A | 1/1997 | Men et al. | |
| 5,718,540 A * | 2/1998 | Satran et al. | 407/42 |
| 5,741,095 A * | 4/1998 | Charron et al. | 407/42 |
| 5,807,031 A | 9/1998 | Arai et al. | |
| 5,957,629 A * | 9/1999 | Hessman et al. | 407/113 |
| 6,050,752 A | 4/2000 | DeRoche | |
| 6,079,912 A | 6/2000 | Rothballer | |
| 6,530,726 B2 | 3/2003 | Nelson | |

(Continued)

FOREIGN PATENT DOCUMENTS

JP       08-057709      3/1996

(Continued)

OTHER PUBLICATIONS

Office Action dated Apr. 20, 2011 issued in corresponding Chinese Patent Application No. 200780100496.8.

(Continued)

*Primary Examiner* — Will Fridie, Jr.
(74) *Attorney, Agent, or Firm* — Womble Carlyle (57) ABSTRACT

A cutting insert of the present invention has a body, auxiliary cutting edges of a convex curve shape and main cutting edges. The body has a top surface, a bottom surface, side surfaces connecting the top and bottom surfaces, and corner surfaces connecting the adjacent side surfaces. The auxiliary cutting edges are formed at intersections between the top and bottom surfaces and the side surfaces. The main cutting edges are formed at intersections between the top and bottom surfaces and the corner surfaces. The main cutting edge in the top surface extends from an end of an adjacent auxiliary cutting edge to its center in a direction toward the bottom surface and from the center to an end of another adjacent auxiliary cutting edge in a direction away from the bottom surface.

20 Claims, 9 Drawing Sheets

U.S. PATENT DOCUMENTS

| | | | |
|---|---|---|---|
| 6,607,333 B2 * | 8/2003 | Satran et al. | 407/33 |
| 6,769,844 B2 * | 8/2004 | Waggle | 407/114 |
| 6,966,729 B2 * | 11/2005 | Dehn et al. | 407/113 |
| 7,476,062 B2 * | 1/2009 | Waggle | 407/113 |
| 2004/0208714 A1 | 10/2004 | Stabel et al. | |

FOREIGN PATENT DOCUMENTS

| | | |
|---|---|---|
| JP | 2000 503912 | 4/2000 |

OTHER PUBLICATIONS

International Search Report in PCT/KR2007/004182, dated May 14, 2008.

Written Opinion in PCT/KR2007/004182, dated May 14, 2008.

Official Action dated Mar. 23, 2012 issued in Japanese counterpart application No. 2010-522776.

* cited by examiner

CUTTING INSERT

TECHNICAL FIELD

The present invention generally relates to a cutting insert for a cutting tool, and more particularly to a cutting insert used for a precision cutting process.

BACKGROUND ART

Figure 1:
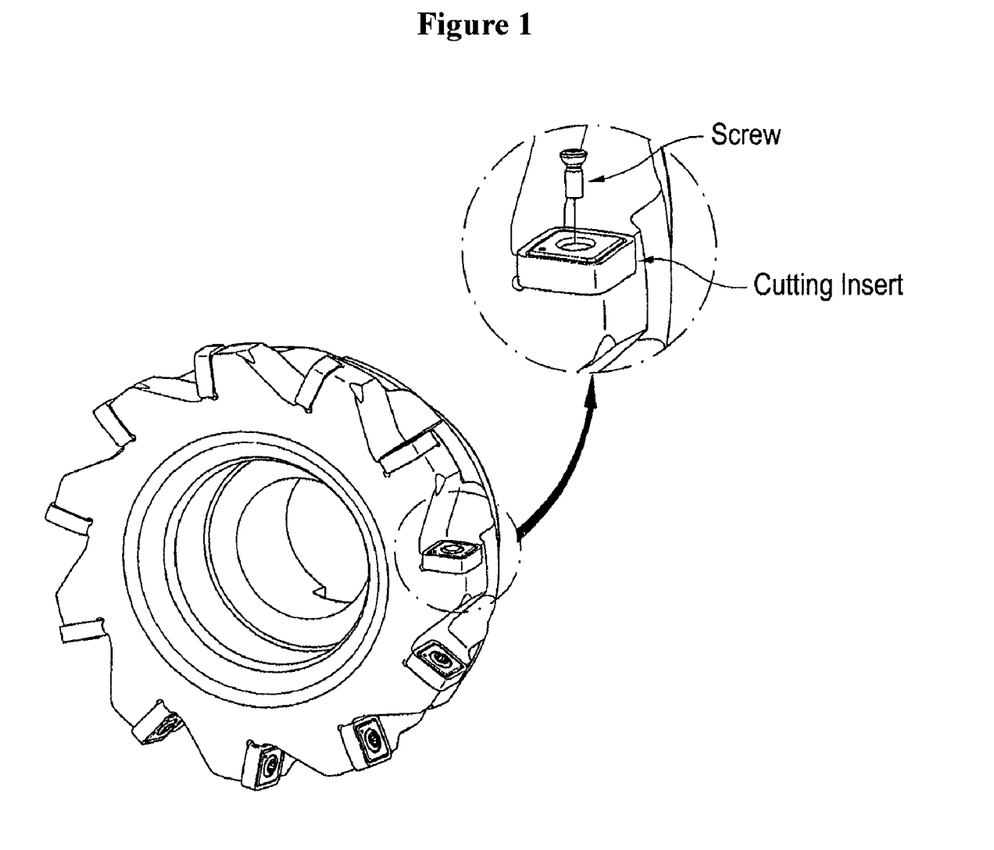
FIG. 1 is a perspective view of the milling cutter with a cutting insert mounted thereto.

A cutting insert is firmly coupled to a body of a tool in order to provide the tool with cutting edges. FIG. 1 shows a cutting insert fixed to a milling cutter using a screw. A cutting insert may also be coupled to the body of a tool by other means such as wedge fixing means.

FIGS. 2 to 6 show a conventional cutting insert and a milling cutter with such a cutting insert mounted thereto.

Figure 2:
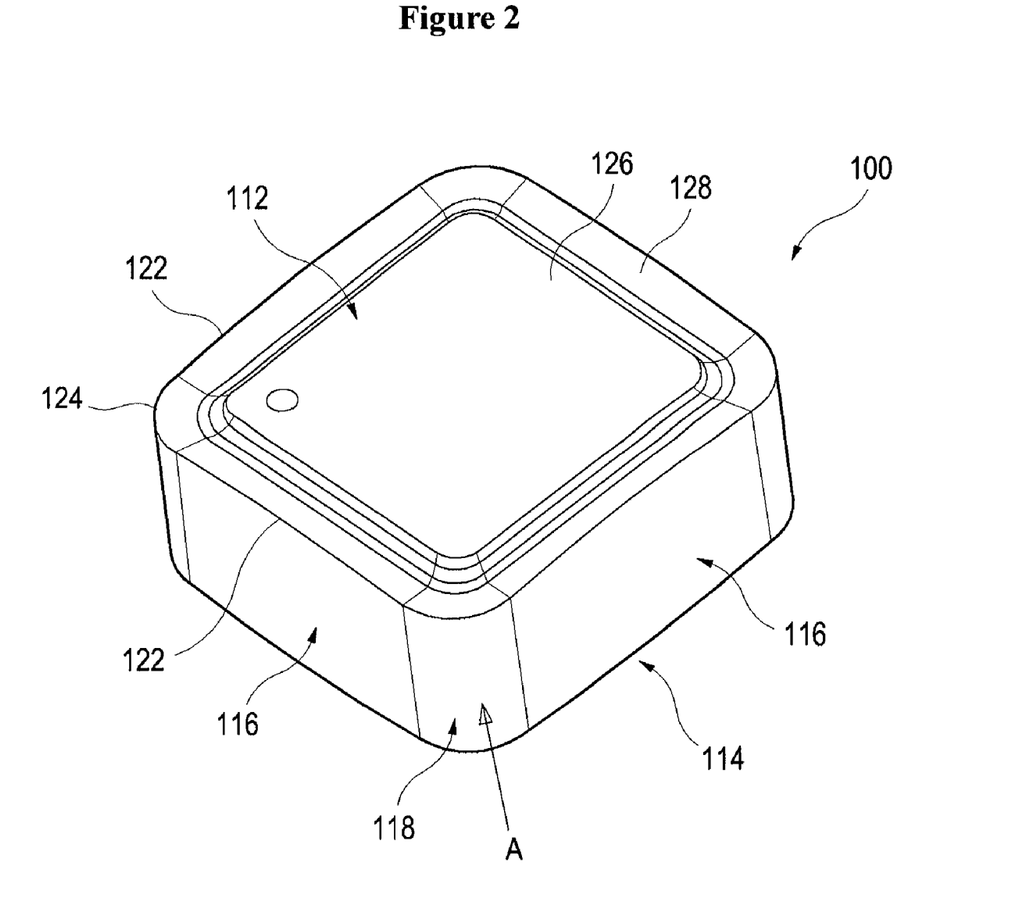
FIG. 2 is a perspective view of a conventional cutting insert used for a precision cutting process.
Figure 3:
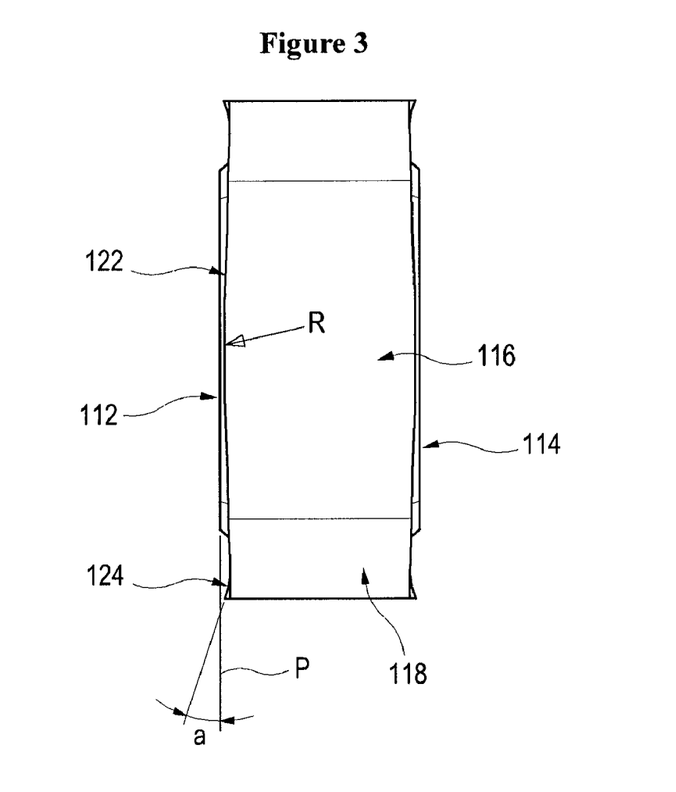
FIG. 3 is a side view of the cutting insert of FIG. 2.

FIG. 2 is a perspective view of a cutting insert, while FIG. 3 is a side view thereof. The cutting insert 100 comprises a top surface 112, a bottom surface 114 and four side surfaces 116 connecting the top surface 112 and the bottom surface 114. The side surface 116 is connected to the other adjacent side surface 116 through a corner surface 118. Further, a curved auxiliary cutting edge 122 having a radius of curvature R is formed at the intersection between the top and bottom surfaces 112, 114 and the side surface 116. A main cutting edge 124 is formed at the intersection between the top and bottom surfaces 112, 114 and the corner surface 118. The main cutting edge 124 connects an auxiliary cutting edge 122 to an adjacent auxiliary cutting edge 122. The top surface 112 and the bottom surface 114 include a mounting surface 126 and a rake surface 128. The rake surface 128 extends at an inclined angle "a" with respect to the mounting surface 126.

Figure 4:
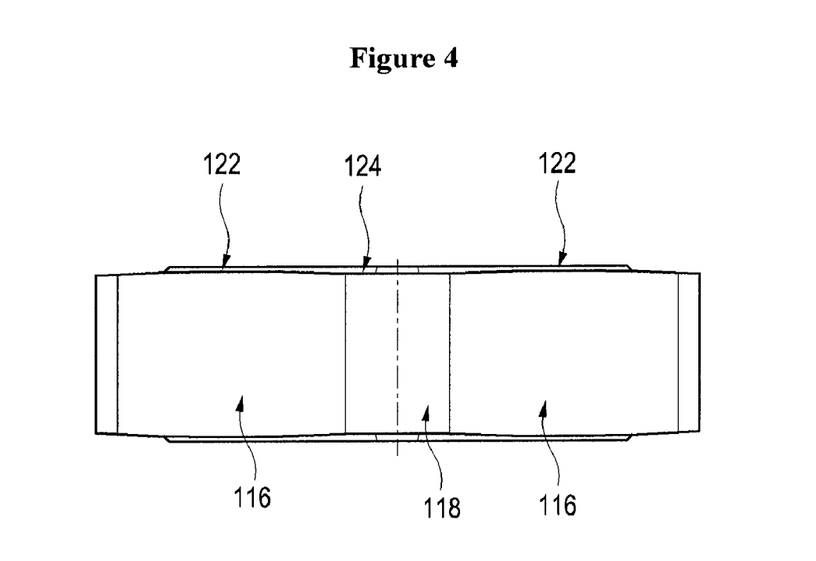
FIG. 4 is a side view taken from the corner surface of the cutting insert of FIG. 2.

FIG. 4 is a view taken from the corner surface 118 (i.e., in a direction indicated by A). As shown in FIG. 4, the main cutting edge 124 of the conventional cutting insert 100 extends horizontally.

Figure 5:
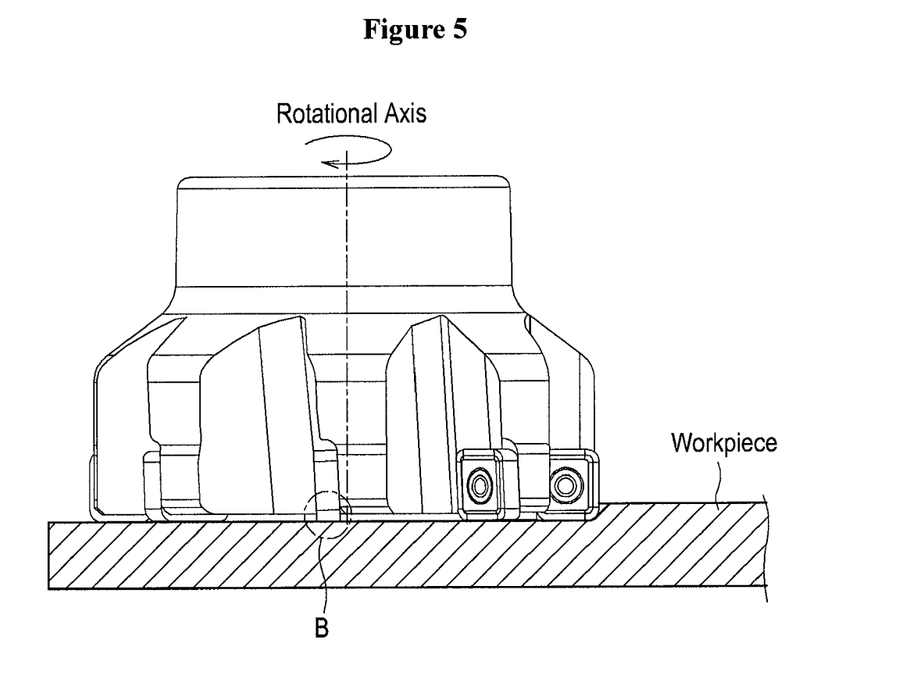
FIG. 5 is a view showing that a milling cutter with the cutting insert of FIG. 2 mounted thereto is in use.
Figure 6:
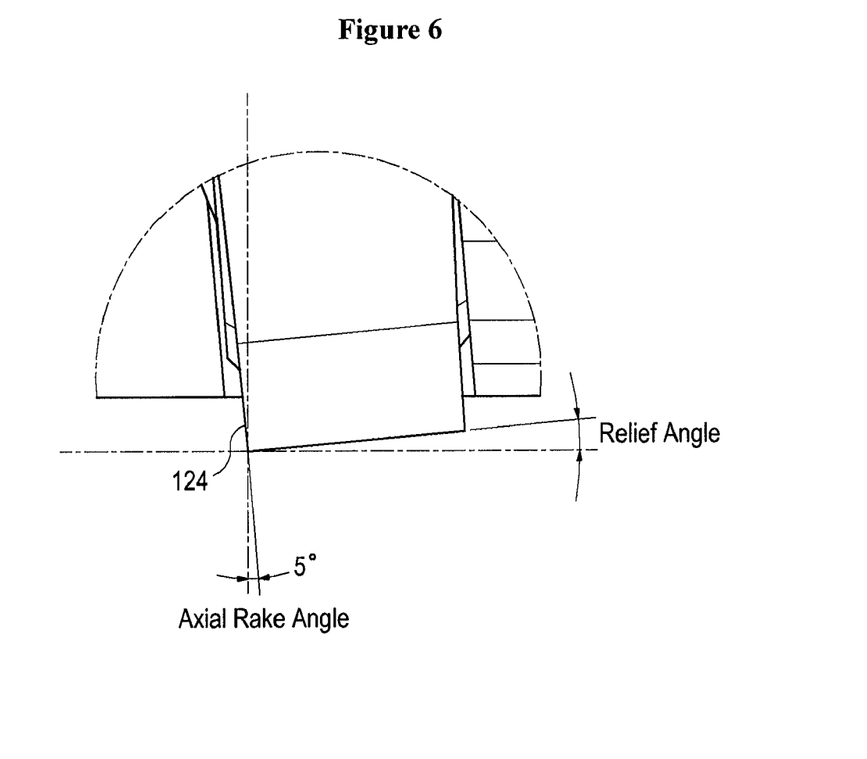
FIG. 6 is an enlarged view of a part B of FIG. 5.

FIG. 5 shows a state where a milling cutter with a conventional cutting insert mounted thereto cuts a surface of a workpiece. FIG. 6 is an enlarged view of a part B of FIG. 5. As shown in FIG. 5, the main cutting edge 124 of the cutting insert 100 performs the function of initially cutting a workpiece along the feed direction of the milling cutter, while the auxiliary cutting edge 122 performs a precision cutting to smoothly polish the portion of the workpiece cut by the main cutting edge 124.

However, due to the manufacturing tolerance of the milling cutter and the cutting insert 100, as well as the mounting error caused when mounting the cutting insert 100 onto the milling cutter, differences in the height of the cutting edges are generated. In order to make the processed surface flat with a high degree of precision, the influence of the error needs to be minimized. As such, the auxiliary cutting edge 122 is formed in the shape of a convex curve having a curvature radius R, which ranges from 100 mm to 200 mm.

Further, the cutting performance of the main cutting edge 124 is closely associated with the axial rake angle of the main cutting edge 124. The axial rake angle represents an angle at which the main cutting edge 124 is inclined relative to the rotation axis of the milling cutter. As shown in FIG. 6, a relief angle is formed to avoid any surface contact between the side surface 116 of the cutting insert 100 and the workpiece. Such an axial rake angle can have a positive value, 0 or a negative value. The positive value represents a case wherein the cutting insert is inclined opposite to the rotational direction of the milling cutter. The negative value represents a case wherein the cutting insert is inclined towards the rotational direction of the milling cutter. The value of 0 represents a case wherein the cutting insert is not inclined relative to the rotational axis. When the axial rake angle has a positive value that becomes greater, chips are more easily eliminated and the cutting resistance is reduced. However, in a conventional cutting insert 100 as shown in FIG. 6, the axial rake angle of the main cutting edge 124 has a negative value (−5° in FIG. 6) to maintain a relief angle generally in the range of 4° to 6°.

Accordingly, since the cutting resistance is significant in the main cutting edge 124 portion, the cutting performance is poor, thereby causing other problems. In particular, when a depth of cut exceeds about 0.5 mm, due to an increase in the cutting resistance, burrs are produced on the processed surface of the workpiece or the main cutting edge 124 applies an excessive pressure to the processed surface of the workpiece, thereby deforming or breaking the structure. Because of these reasons, the depth of a cut is remarkably limited when the conventional cutting insert is used for a precision cutting, which requires a very small surface roughness.

SUMMARY OF THE INVENTION

It is an object of the present invention to solve the foregoing problems of the prior art, reduce cutting resistance against the main cutting edge during the cutting process and improve the cutting performance by creating a positive axial rake angle with the main cutting edge formed at the corner surface of the cutting insert. Particularly, the present invention is directed to providing a cutting insert that can perform precision cutting with a depth of cut greater than about 0.5 mm.

Furthermore, the object of the present invention is to provide a cutting insert that reduces the friction force on the workpiece during the cutting process by lowering the radius of curvature of the auxiliary cutting edge.

In order to achieve the above object, the present invention provides a cutting insert, which comprises: a body of a rectangular parallelepiped shape, the body comprising a top surface, a bottom surface, a plurality of side surfaces connecting the top and bottom surfaces, and a plurality of corner surfaces connecting the adjacent side surfaces; one or more auxiliary cutting edges of a convex curve shape, the auxiliary cutting edges being formed at intersections between the top and bottom surfaces and one or more of the plurality of side surfaces; and one or more main cutting edges formed at intersections between the top and bottom surfaces and one or more of the plurality of corner surfaces. Each of the top surface and the bottom surface comprises a mounting surface and a rake surface extending at an inclined angle with respect to the mounting surface. The main cutting edge in the top surface extends from an end point of an adjacent auxiliary cutting edge to a center of the main cutting edge in a direction towards the bottom surface, and from the center to a meeting point with another adjacent auxiliary cutting edge in a direction away from the bottom surface. The main cutting edge in the bottom surface extends from an end point of an adjacent auxiliary cutting edge to the center of the main cutting edge in a direction towards the top surface, and from the center to a meeting point with another adjacent auxiliary cutting edge in a direction away from the top surface.

According to one embodiment of the present invention, the cutting insert has 90° rotation symmetry about an axis passing through centers of the top and bottom surfaces. It also has 180° rotation symmetry about an axis passing through centers of the side surface and the opposite side surface thereof. A distance between a line extending from the auxiliary cutting edge to the center of the main cutting edge is 1.0 mm to 2.0 mm when seen from the top surface.

According to one embodiment of the present invention, the main cutting edge in the top surface or the bottom surface makes an angle of 8° to 18° with the mounting surface of the top surface or the bottom surface when seen from the corner surface. The radius of curvature of the auxiliary cutting edge is 20 mm to 60 mm.

According to one embodiment of the present invention, the main cutting edge comprises a straight part and curved parts located at both ends thereof when seen from the top surface. The straight part of the main cutting edge makes an angle of 45° with an adjacent auxiliary cutting edge. The length of the auxiliary cutting edge is 40% to 60% of the distance between the side surface and the opposite side surface thereof when seen from the top surface.

DETAILED DESCRIPTION

The present invention will now be described with reference to embodiments shown in the accompanying drawings.

Figure 7:
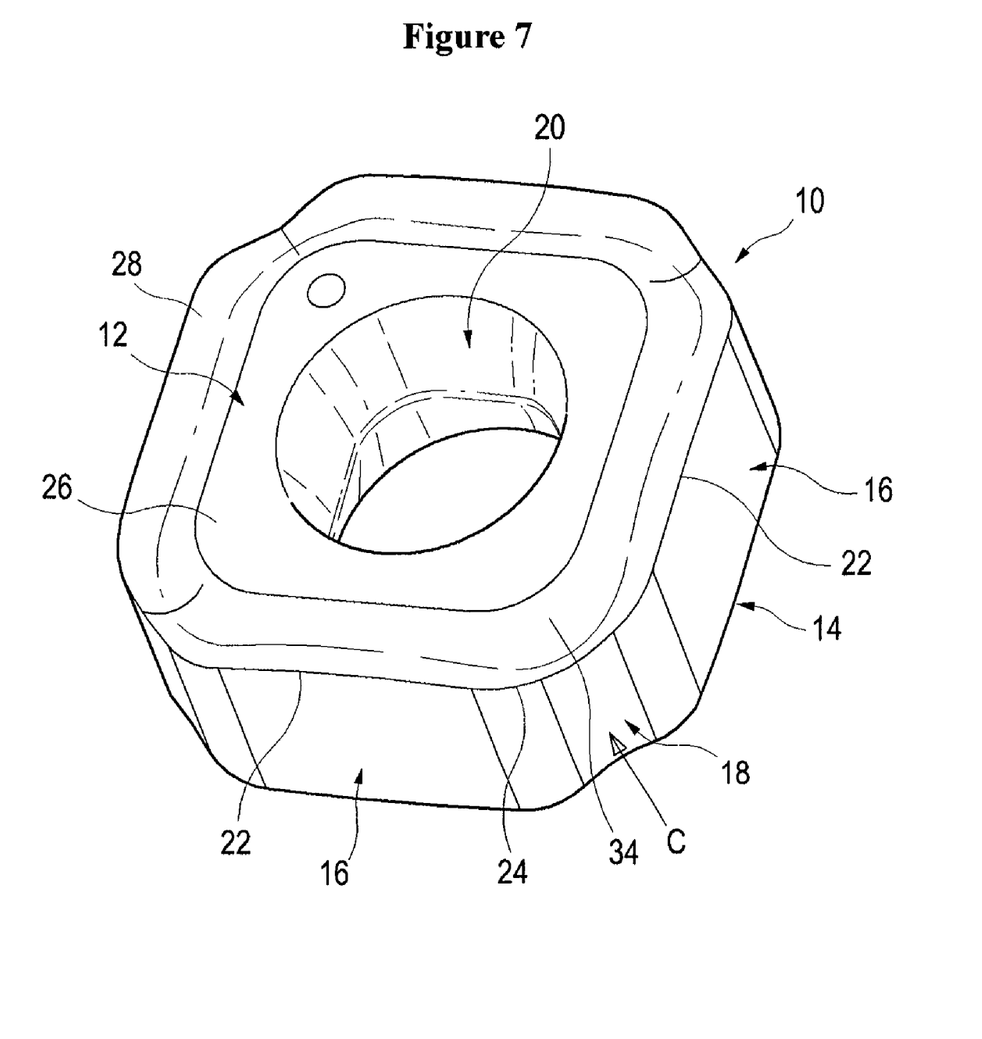
FIG. 7 is a perspective view of a cutting insert according to an embodiment of the present invention.
Figure 8:
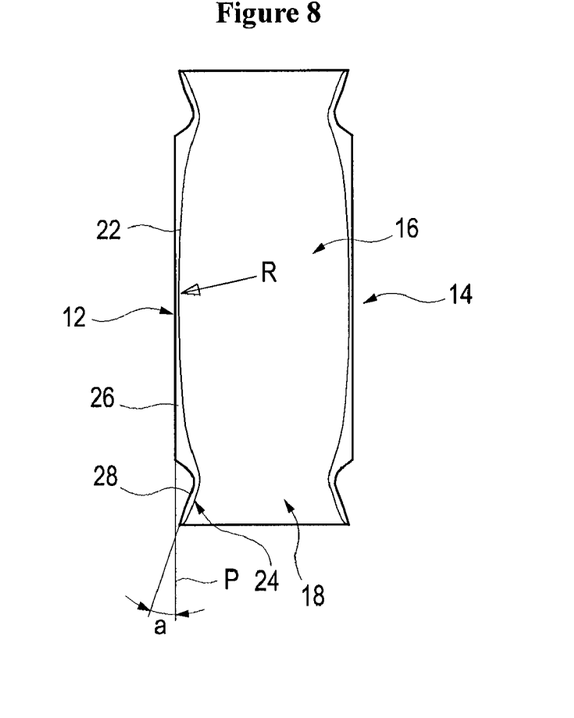
FIG. 8 is a side view of the cutting insert of FIG. 7.

FIG. 7 is a perspective view of a cutting insert according to one embodiment of the present invention. FIG. 8 is a side view of the cutting insert of FIG. 7. The cutting insert 10 has a generally rectangular parallelepiped shape. The cutting insert has top and bottom surfaces 12, 14, which are opposite to and extend parallel to each other, and four side surfaces 16 vertically connecting the top surface 12 and the bottom surface 14. One side surface 16 is connected to another adjacent side surface 16 through a corner surface 18. The cutting insert 10 includes a mounting bore 20, through which a screw passes to fix the cutting insert 10 to a body of a tool. As shown in FIG. 8, an intersection between the top surface 12 and the side surface 16 (or the bottom surface 14 and the side surface 16) defines an auxiliary cutting edge 22 of a convex curve shape with a radius of curvature R. An intersection between the top surface 12 and the corner surface 18 (or the bottom surface 14 and the corner surface 18) defines a main cutting edge 24. One auxiliary cutting edge 22 is connected to another adjacent auxiliary cutting edge 22 through the main cutting edge 24. Each of the top surface 12 and the bottom surface 14 is comprised of a mounting surface 26 and a rake surface 28. The rake surface 28 is inclined from the auxiliary cutting edge 22 and the main cutting edge 24 at an inclined angle "a" with respect to the mounting surface 26. The cutting insert 10 has 90° rotation symmetry about an axis passing through the centers of the top surface 12 and the bottom surface 14. Further, the cutting insert has 180° rotation symmetry about an axis passing through the centers of the side surface 16 and the opposite side surface thereof.

Figure 9:
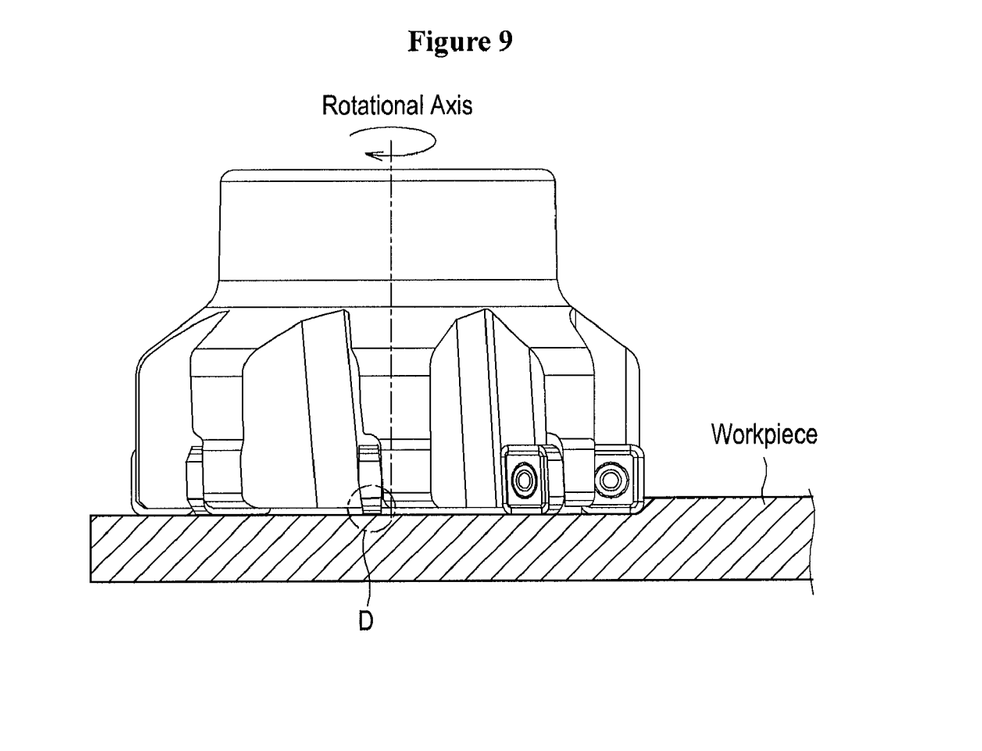
FIG. 9 is a view showing a milling cutter with the cutting insert of FIG. 7 mounted thereto is in use.
Figure 10:
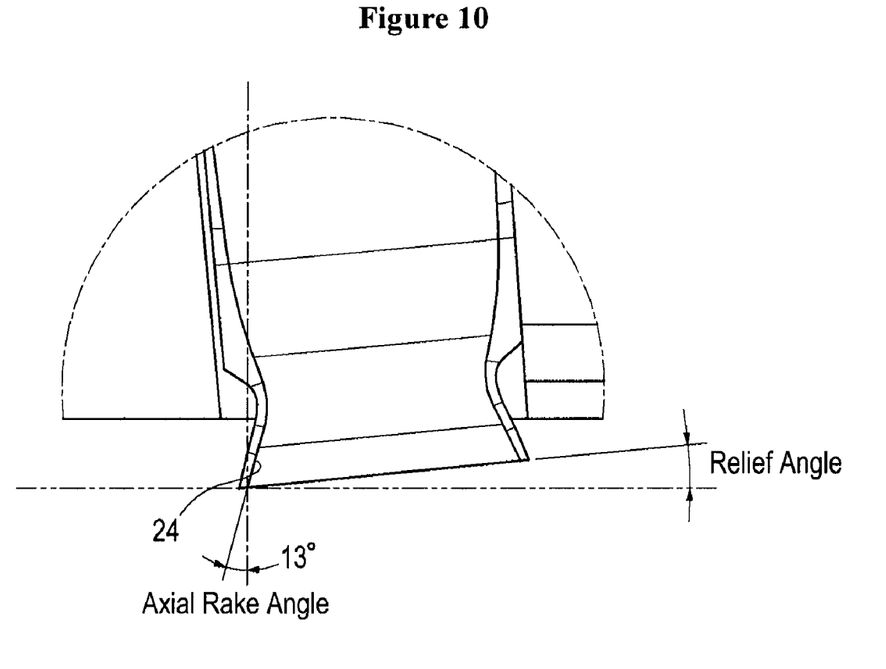
FIG. 10 is an enlarged view of a part D of FIG. 9.

FIG. 9 shows that a milling cutter with the cutting insert of FIG. 7 mounted thereto performs a cutting process on a workpiece. FIG. 10 is an enlarged view of a part D of FIG. 9. As shown in FIG. 9, the main cutting edge 24 of the cutting insert 10 performs the function of initially cutting the workpiece along a feed direction of the milling cutter, while the auxiliary cutting edge 22 performs a precision cutting to smoothly polish the portion of the workpiece, which is cut by the main cutting edge 24. Meanwhile, a cutting performance of the main cutting edge 24 is closely related to an axial rake angle of the main cutting edge 24. It is advantageous that the axial rake angle has a positive value so as to reduce a cutting resistance.

Figure 11:
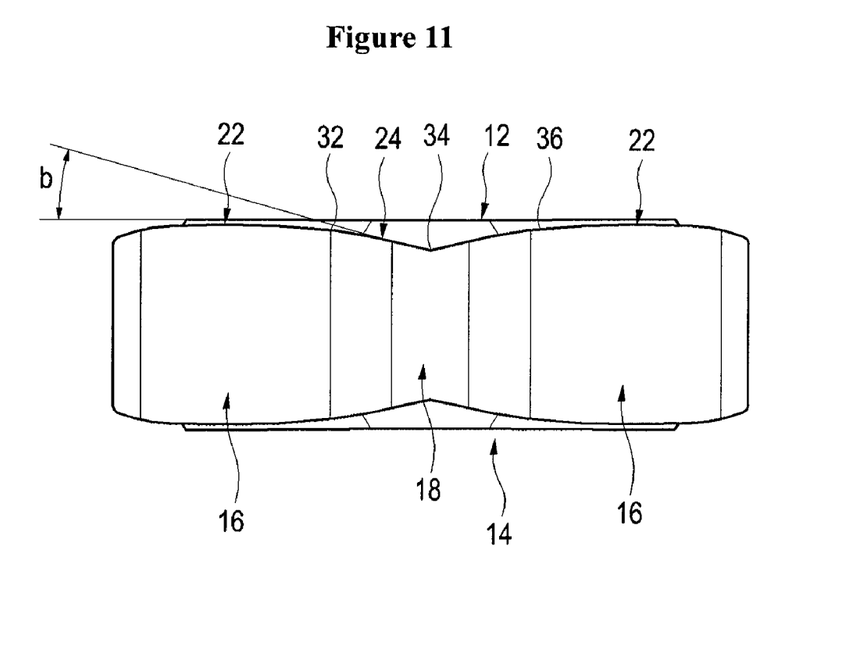
FIG. 11 is a side view taken from the corner surface of the cutting insert of FIG. 7.

FIG. 11 is a view taken from the corner surface of the cutting insert of FIG. 7 (i.e., in a direction indicated by C). The main cutting edge 24 in the top surface 12 extends from an end point 32 of an adjacent auxiliary cutting edge 22 to a center 34 of the main cutting edge 24 in a direction towards the bottom surface 14, and extends from the center 34 of the main cutting edge 24 to a meeting point with another adjacent auxiliary cutting edge 22 in a direction away from the bottom surface 24. Similarly, the main cutting edge in the bottom surface 14 extends from an end point of an adjacent auxiliary cutting edge to the center of the main cutting edge in a direction towards the top surface, and extends from the center of the main cutting edge to a meeting point with another adjacent auxiliary cutting edge in a direction away from the top surface. In other words, the main cutting edge 24 in the corner surface 18 has the lowest height at the center 34 when seen from the corner surface 18.

The main cutting edge 24 in the top surface 12 or the bottom surface 14 makes an angle "b" of 8° to 18° with the mounting surface of the top surface 12 or the bottom surface 14 when seen from the corner surface (i.e., in the direction indicated by C). The cutting insert 10 is mounted to the milling cutter with a relief angle therebetween in order to avoid any surface contact to the workpiece. Preferably, the angle "b" is equal to or greater than 8° such that the axial rake angle of the main cutting edge 24 of the cutting insert 10 has a positive value even with such a relief angle. In contrast, too much of a large angle "b" not only makes it difficult to fabricate the cutting insert but also decreases the stiffness of the cutting insert. Thus, it is preferable that the angle "b" is equal to or less than 18°. Since the main cutting edge 24 is formed as described above, the axial rake angle of the main cutting edge 24 of the cutting insert 10 according to the present invention is allowed to have a positive value (e.g., +13° in FIG. 10) when the cutting insert 10 is mounted to the milling cutter and cuts a processed surface of the workpiece as shown in FIG. 10. Accordingly, the cutting resistance in the main cutting edge 24 portion is reduced and the cutting performance is remarkably improved when compared to a conventional cutting insert.

Figure 12:
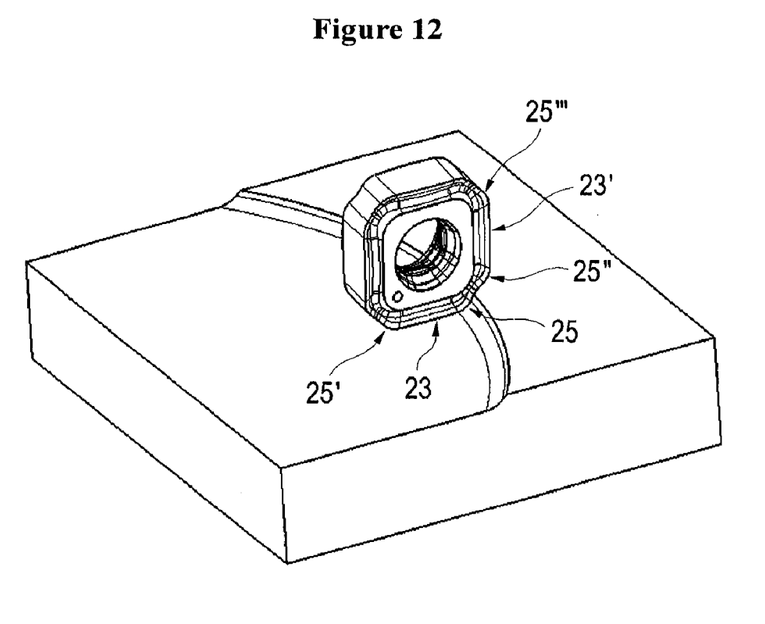
FIG. 12 is a view showing the cutting insert of FIG. 7 during the cutting of a workpiece.

FIG. 12 shows that the cutting insert of the present invention cuts the workpiece. The cutting insert 10 performs a cutting process while one auxiliary cutting edge 22 and one main cutting edge 24 are contacted to the workpiece. For example, in the state shown in FIG. 12, the auxiliary cutting edge 23 and the main cutting edge 25 perform the cutting process. More specifically, since the cutting insert 10 is mounted as tilted towards the main cutting edge 25 contacted to the workpiece, the main cutting edge 25 and a right side of the auxiliary cutting edge 23 mainly perform the cutting process. However, the cutting process may be performed by the auxiliary cutting edge 23 (mainly, a left side of the auxiliary cutting edge) and the main cutting edge 25' by reversing a rotational direction of the cutting insert. Further, the cutting process may be performed by the auxiliary cutting edge 23' and the main cutting edge 25" or 25'" by altering the mounting position of the cutting insert. Since the cutting insert 10 has 90° rotation symmetry about the axis passing through the centers of the top surface 12 and the bottom surface 14 and 180° rotation symmetry about the axis passing through the centers of the side surface 16 and the opposite side surface thereof as described above, the cutting insert includes four auxiliary cutting edges 22 and four main cutting edges 24 at each of the top surface 12 and the bottom surface 14. The main cutting edges 24 are bilaterally symmetrical about the center 34 as shown in FIG. 11. Thus, the cutting insert 10 has sixteen identically shaped pairs of an auxiliary cutting edge and a main cutting edge (e.g., 23 and 25, 23 and 25') in total (more specifically, eight pairs at the top surface 12 and eight pairs at the bottom surface 14). Accordingly, a single cutting insert 10 may be used sixteen times, thereby providing an economical use.

Figure 13:
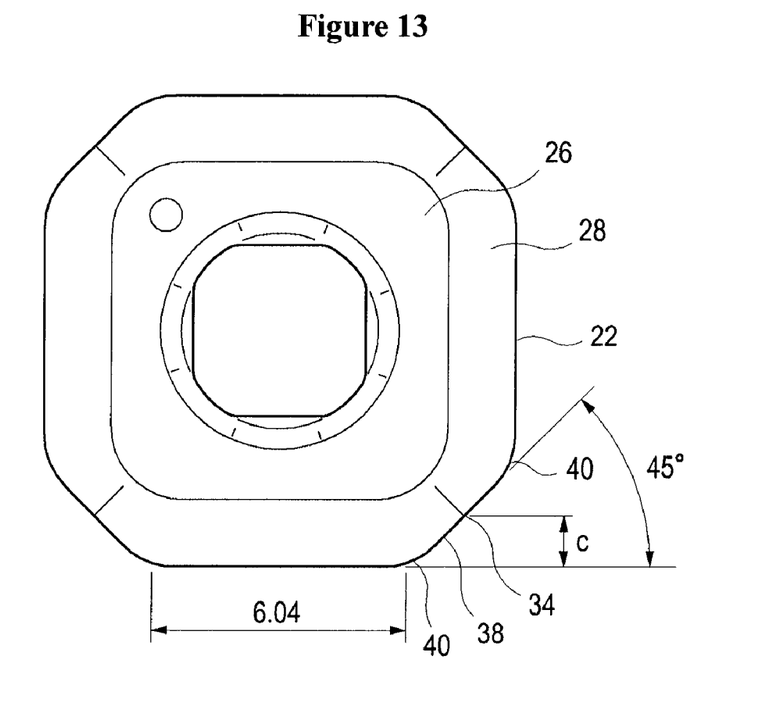
FIG. 13 is a top view of the cutting insert of FIG. 7.
Figure 14:
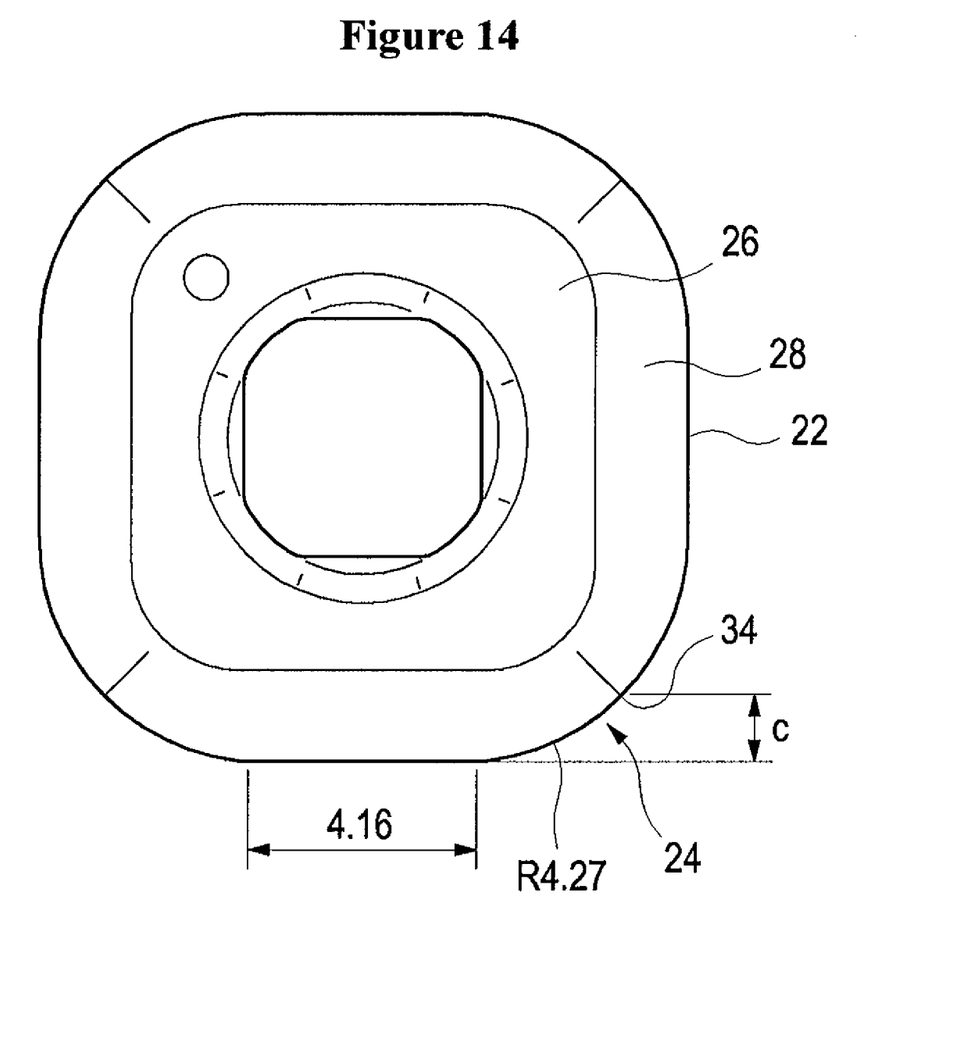
FIG. 14 is a top view of a cutting insert according to another embodiment of the present invention.

FIG. 13 is a top view of the cutting insert of FIG. 7. FIG. 14 is a top view of a cutting insert according to another embodiment of the present invention. As shown in FIGS. 13 and 14, a distance "c" between a line extending from the auxiliary cutting edge 22 to the center of the main cutting edge 24 is about 1.0 mm to 2.0 mm when seen from the top surface. Thus, when the cutting insert 10 performs the cutting process as mounted to a body of a tool, even in case a depth of cut exceeds 0.5 mm and reaches about 1.0 mm, the axial rake angle of the main cutting edge 24, which is formed at the corner surface 18 of the cutting insert 10, has a positive value with respect to such depth of cut. Thus, a problem caused by increase of the cutting resistance does not occur even in the case of the depth of cut of about 1.0 mm. Further, problems that burrs are produced on the processed surface of the workpiece and that the main cutting edge 24 applies excessive pressure to the processed surface of the workpiece to deform or break its structure are eliminated. Accordingly, the cutting insert of the present invention can increase a depth of cut which can perform a precise cutting process when compared to the conventional cutting insert.

Further, the main cutting edge 24 of the cutting insert shown in FIG. 13 is comprised of a straight part 38 and curved parts 40 located at both ends thereof when seen from the top surface. The main cutting edge 24 is bilaterally symmetrical about the center 34. The straight part makes an angle of 45° with the adjacent auxiliary cutting edge 22. The corner surface 18 is comprised of a flat surface and curved surfaces located at both sides thereof. The flat surface makes an angle of 45° with the adjacent side surface 16. Further, the main cutting edge 24 of the cutting insert shown in FIG. 14 is comprised of only a curved part (indicated by R4.27 in FIG. 14) and the corner surface 18 is comprised of only a curved surface. The auxiliary cutting edge 22 performs a precision cutting to smoothly polish the portion of the workpiece cut by the main cutting edge 24. A shorter auxiliary cutting edge limits a feed amount of the workpiece and slows down a processing speed. Accordingly, as for cutting inserts having the same depth of cut, the main cutting edge 24 comprised of the straight part and the curved parts located at both ends thereof has an advantage of having a longer auxiliary cutting edge 22 than the main cutting edge 24 comprised of only the curved part.

Specifically, when the cutting inserts shown in FIGS. 13 and 14 are seen from the top surface, the distances "c" between the line extending from the auxiliary cutting edge 22 to the center 34 of the main cutting edge 24 are the same. However, in the case shown in FIG. 13 where the main cutting edge 24 is comprised of the straight part 38 and the curved parts 40 located at both ends thereof, the length of the auxiliary cutting edge 22 is about 40% to 60% of the distance between the side surface and the opposite side surface thereof (e.g., 6.04 mm in FIG. 13). In the case shown in FIG. 14 where the main cutting edge 24 is comprised of only a curved part, the length of the auxiliary cutting edge 22 is about 30% to 50% of the distance between the side surface and the opposite side surface (e.g., 4.16 mm in FIG. 14).

As shown in FIG. 8, the auxiliary cutting edge 22 of the cutting insert 10 of the present invention has a convexly curved shape wherein its middle portion is upward or downward higher than both sides thereof when seen from the side surface. Preferably, its radius of curvature R is in a range of 20 mm to 60 mm. As such, the cutting insert 10 of the present invention has the auxiliary cutting edge 22 with a small radius of curvature. Thus, a friction force on the workpiece, which is generated during cutting process, becomes small.

Thus, as seen in the side view of FIG. 8, each auxiliary cutting edge 22 has a convexly curved shape and a distance between centers of opposing auxiliary cutting edges associated with the top surface 12 and bottom surface 14 defines a maximum height for the viewed side surface 16 and adjacent corner surfaces 18. Meanwhile, as seen in the FIG. 11 corner view of the cutting insert, the main cutting edge 14 has a concave shape, a distance between centers 34 of main cutting edges 24 associated with the top surface 12 and the bottom surface 14 defines a minimum height for the viewed corner surface 18 and adjacent side surfaces 16.

While the present invention has been described by way of preferred embodiments thereof, those embodiments are for exemplary purposes only. It will be understood by those of ordinary skill in the art that various alternations or modifications may be made without departing from the scope of the present invention. The cutting insert according to one embodiment of the present invention includes a mounting bore and is fixed to a body of a tool by means of a screw passing through the mounting bore. However, it may not include the mounting bore and may be fixed by means of other fixing means such as a wedge fixing means, which is obvious to those of ordinary skill in the art. The cutting insert according to one embodiment of the present invention has a generally rectangular parallelepiped shape. The cutting edges are formed at all of the intersections between the top or bottom surface and the side or corner surfaces. However, it is obvious to those of ordinary skill in the art that the cutting edges are formed only at some of the intersections. Such alternations or modifications obvious to those of ordinary skill in the art fall within the scope of the present invention.

As described above in detail, the present invention provides a cutting insert which reduces cutting resistance against the main cutting edge during the cutting process and improves the cutting performance by creating a positive axial rake angle with the main cutting edge formed at the corner surface of the cutting insert.

The invention claimed is:

1. A cutting insert, comprising:
a body including a top surface, a bottom surface, a plurality of side surfaces connecting the top surface and the bottom surface, the body further including a plurality of corner surfaces connecting adjacent side surfaces;
one or more auxiliary cutting edges with a convex curve shape, the auxiliary cutting edges being formed at intersections between the top and bottom surfaces and one or more of the plurality of side surfaces; and
one or more main cutting edges formed at intersections between the top and bottom surfaces and one or more of the plurality of corner surfaces,
wherein each of the top surface and the bottom surface comprises a mounting surface and a rake surface extending at an inclined angle with respect to the mounting surface;
wherein the main cutting edge in the top surface extends from an end point of an adjacent auxiliary cutting edge to a center of the main cutting edge in a direction towards the bottom surface, and from the center to a meeting point with another adjacent auxiliary cutting edge in a direction away from the bottom surface; and
wherein the main cutting edge in the bottom surface extends from an end point of an adjacent auxiliary cutting edge to the center of the main cutting edge in a direction towards the top surface, and from the center to a meeting point with another adjacent auxiliary cutting edge in a direction away from the top surface.

2. The cutting insert according to claim 1, wherein
the cutting insert has 90° rotation symmetry about an axis passing through centers of the top and bottom surfaces; and
wherein the cutting insert has 180° rotation symmetry about an axis passing through centers of side surfaces on opposite sides of the cutting insert.

3. The cutting insert according to claim 1, wherein a distance between a line extending from the auxiliary cutting edge to the center of the main cutting edge is 1.0 mm to 2.0 mm, in a top view of the cutting insert.

4. The cutting insert according to claim 1 wherein, in a corner view of the cutting insert:
the main cutting edge in the top surface makes an angle of 8° to 18° with the mounting surface of the top surface; and
the main cutting edge in the bottom surface makes an angle of 8° to 18° with the mounting surface of the bottom surface.

5. The cutting insert according to claim 1, wherein a radius of curvature of the auxiliary cutting edge is 20 mm to 60 mm.

6. The cutting insert according to claim 1, wherein, in a top view of the cutting insert, the main cutting edge comprises a straight part and curved parts located on either side of the straight part.

7. The cutting insert according to claim 6, wherein the straight part of the main cutting edge forms an angle of 45° with an adjacent auxiliary cutting edge.

8. The cutting insert according to claim 6, wherein, in a top view of the cutting insert, the length of the auxiliary cutting edge is 40% to 60% of the distance separating side surfaces on opposite sides of the cutting insert.

9. The cutting insert according to claim 1, wherein, in a top view of the cutting insert, the main cutting edge comprises only a curved part which connects two adjacent auxiliary cutting edges.

10. The cutting insert according to claim 1, wherein the cutting insert has a rectangular parallelepiped shape.

11. The cutting insert according to claim 10, wherein, in a top view of the cutting insert, the auxiliary cutting edges all have the same length.

12. A cutting insert, comprising:
a body including a top surface, a bottom surface, four side surfaces connecting the top surface and the bottom surface, and four corner surfaces connecting adjacent side surfaces;
auxiliary cutting edges formed at intersections between the top and bottom surfaces, and the side surfaces;
main cutting edges formed at intersections between the top and bottom surfaces, and the corner surfaces, each main cutting edge connecting adjacent auxiliary cutting edges;
a mounting surface associated with each of the top and bottom surfaces; and
a rake surface associated with each mounting surface and extending at an inclined angle with respect to said each mounting surface; wherein:
in a side view of the cutting insert, each auxiliary cutting edge has a convex curve shape and a distance between centers of auxiliary cutting edges associated with the top and bottom surfaces defines a maximum height for the viewed side surface and adjacent corner surfaces; and
in a corner view of the cutting insert, each main cutting edge has a concave shape and a distance between centers of main cutting edges associated with the top and bottom surfaces defines a minimum height for the viewed corner surface and adjacent side surfaces.

13. The cutting insert according to claim 12, wherein:
in a side view of the cutting insert, a distance between the mounting surfaces defines a maximum height of the cutting insert.

14. A cutting insert, comprising:
a body including a top surface, a bottom surface, four side surfaces connecting the top surface and the bottom surface, and four corner surfaces connecting adjacent side surfaces;
auxiliary cutting edges formed at intersections between the top and bottom surfaces, and the side surfaces; and
main cutting edges formed at intersections between the top and bottom surfaces, and the corner surfaces, each main cutting edge connecting adjacent auxiliary cutting edges; wherein:
in a side view of the cutting insert, each auxiliary cutting edge has a convex curve shape and a distance between centers of auxiliary cutting edges associated with the top and bottom surfaces defines a maximum height for the viewed side surface and adjacent corner surfaces;
in a corner view of the cutting insert, each main cutting edge has a concave shape and a distance between centers of main cutting edges associated with the top and bottom surfaces defines a minimum height for the viewed corner surface and adjacent side surfaces; and
in a top view of the cutting insert, the main cutting edge comprises a straight part and curved parts located on either side of the straight part.

15. The cutting insert according to claim 14, wherein the straight part of the main cutting edge forms an angle of 45° with an adjacent auxiliary cutting edge.

16. The cutting insert according to claim 14, wherein, in a top view of the cutting insert, the length of the auxiliary cutting edge is 40% to 60% of the distance separating side surfaces on opposite sides of the cutting insert.

17. The cutting insert according to claim 12, wherein, in a top view of the cutting insert, the main cutting edge comprises only a curved part which connects two adjacent auxiliary cutting edges.

18. The cutting insert according to claim 12 wherein the cutting insert has a rectangular parallelepiped shape.

19. The cutting insert according to claim 18, wherein, in a top view of the cutting insert, the auxiliary cutting edges all have the same length.

20. The cutting insert according to claim 14, wherein:

the cutting insert has a rectangular parallelepiped shape; and in the top view of the cutting insert, the auxiliary cutting edges all have the same length.

* * * * *